May 20, 1924.

W. C. MORGAN

MACHINE FOR USE IN MANUFACTURE OF CONFECTIONS

Filed March 4 1922

1,494,498

Inventor
WILLIAM C. MORGAN
By Attorney
Richard J. Cook

Patented May 20, 1924.

1,494,498

UNITED STATES PATENT OFFICE.

WILLIAM C. MORGAN, OF EVERETT, WASHINGTON, ASSIGNOR TO ZERO ICE CREAM DIPPING MACHINE COMPANY, INC., OF EVERETT, WASHINGTON.

MACHINE FOR USE IN MANUFACTURE OF CONFECTIONS.

Application filed March 4, 1922. Serial No. 541,040.

*To all whom it may concern:*

Be it known that I, WILLIAM C. MORGAN, a citizen of the United States, and a resident of Everett, county of Snohomish, and State of Washington, have invented certain new and useful Improvements in Machines for Use in Manufacture of Confections, of which the following is a specification.

This invention relates to mechanism for use in the manufacture of confections, and more particularly to a machine for use in dipping confections, such as ice cream bars, frozen fruits, custards, or the like.

The principal object of the invention is to provide a machine comprising a rotatably supported drum, equipped with means whereby confections to which a coating of chocolate, caramel, or the like, has been applied may be suspended, and conveyed over a dripping basin while this coating is cooling and setting.

Another object of the invention resides in the specific construction of certain spring clamps whereby the confections may be suspended from the drum, and in the means whereby the tension of the clamps may be adjusted as desired.

Other objects of the invention reside in the details of construction of the drum, the basin whereby the coating material is prepared and in the manner in which the drum is mounted; also in the provision of agitators on the drum that act to stir the coating material.

In accomplishing these and other objects of the invention, I have provided the improved details of construction, the preferred forms of which are illustrated in the accompanying drawings, wherein—

Referring more in detail to the drawings—

1 designates what may be a circular basin of any suitable diameter and depth and which is supported from its upper peripheral edge within a similarly shaped boiler 2; the latter being of greater depth than the basin in order that a space will be provided between them wherein water, as indicated at 3, may be contained. The boiler is provided with legs 4 and may be supported thereby upon a counter, or table, as shown at 5.

Figure 3:
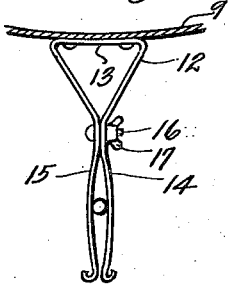
Figure 3 is a plan view of one of the clamps whereby the confections may be supported from the drum while cooling.

Fixed centrally of the basin is a vertical standard 6, and revolubly supported thereon at a suitable working distance above the basin, is a horizontally revoluble drum 8; the standard being in the axial line of the drum and the latter comprising vertical side walls 9 and a conical top, or cover, 10. Secured to the side walls of the drum, at regular intervals, are radially extending spring clamps 12; each of these clamps consisting of a strip of spring metal that is first bent substantially in a U-shape with a substantially flat base portion 13, see Figure 3, from which extend legs 14 and 15. These are drawn together near the base and a bolt 16 extended therethrough on which a wing nut 17 is threaded, and which may be adjusted on the bolt to regulate the tension of the legs against any object that may be inserted between their yieldable outer end portions. The outer ends of these legs are bent outwardly and curved rearwardly so as to provide a mouth which permits an easy insertion of any object between them.

Figure 1:
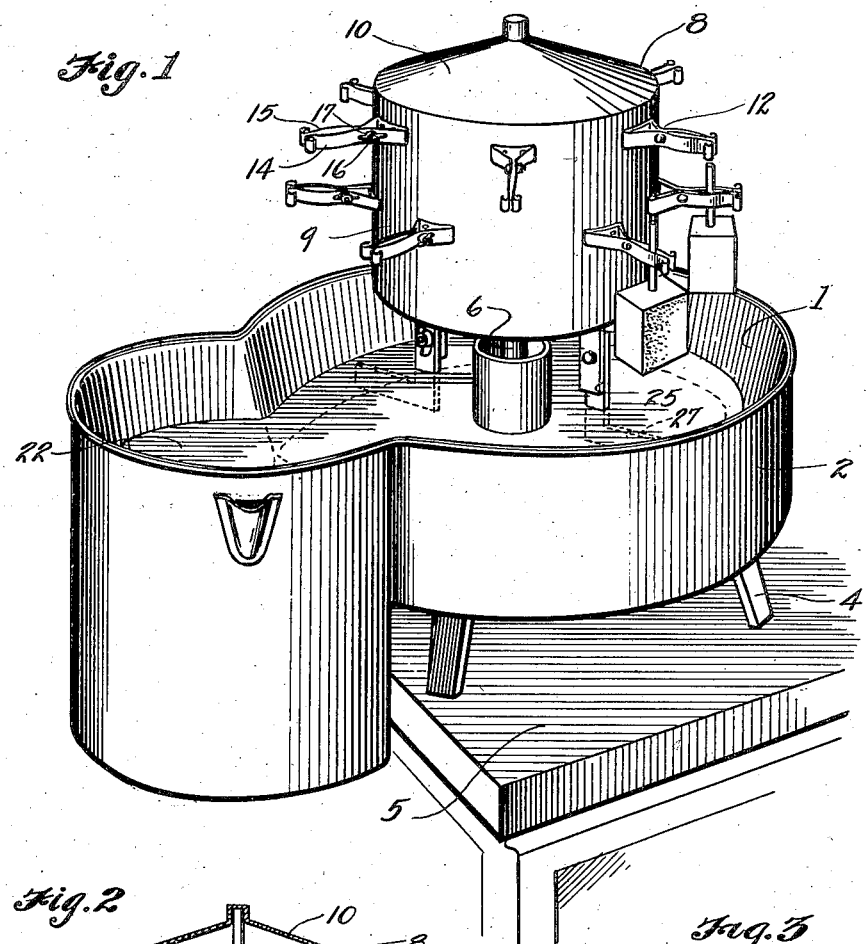
Figure 1 is a perspective view of a confection dipping and conveying mechanism constructed in accordance with the present invention.
Figure 2:
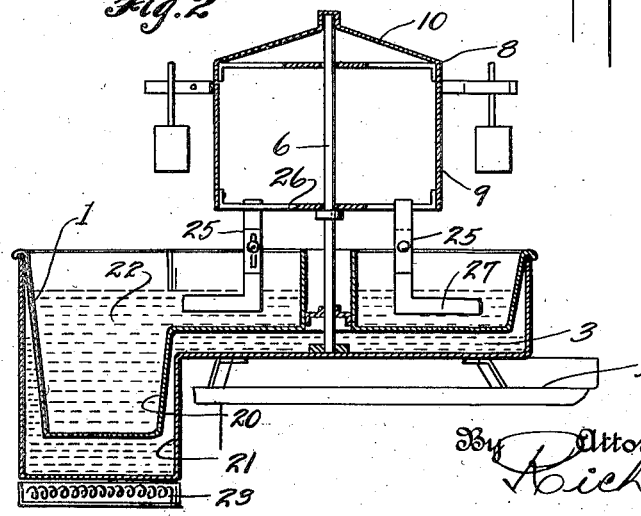
Figure 2 is a central, sectional view of the same, particularly illustrating the double construction of the container wherein the coating material is prepared.

At one side the basin opens into a well 20 of sufficient depth that confections may be dipped therein. The boiler accordingly is provided with a corresponding well 21 into which the basin well extends and which likewise provides a water space between them. The coating material used is indicated at 22 in Figure 2, and fills the well and the basin to about half its depth. It may be cooked and retained hot in working condition by use of a heating element, as at 23, placed beneath the boiler well.

In order to keep the coating material, which is usually a chocolate or caramel substance, in working condition and thoroughly mixed, I have fixed downwardly depending agitator arms 25 to a cross piece 26 within the drum. These agitators comprise end portions 27 that lie adjacent the bottom of the basin so that as the drum revolves they stir and agitate the coating mixture therein.

In using the device, the operator picks up the confections that are to be dipped by means of stems, as at 30, which are inserted within them. The confections are then dipped in the well 20 so that they are thoroughly coated and are then suspended from the drum, by inserting the stems between the holding members of the clamps that are fixed to the drum. The drum is advanced each time so as to bring successive clamps into position adjacent the dipping well. While the coating is setting, any substance that drips from the confections is caught in the basin and is not wasted.

It is noted that the tension of the spring fingers may be varied, as is required, by the adjustment of the nut 17 on the bolt 16, so that the stems of the confections may be easily inserted, or removed.

It is intended that such devices be made in various sizes suitable for factory use, or for use in soda fountains, ice cream parlors, or the like.

Having thus described my invention, what I claim as new therein and desire to secure by Letters Patent, is:

1. A device of the class described, comprising in combination a basin for containing a coating substance, a drum supported for horizontal rotation above the basin and means about the periphery of the drum for supporting articles after being dipped in the coating substance in position that drippings therefrom will fall into the basin.

2. A device of the class described, comprising a basin for containing a coating substance, a drum rotatably supported centrally above the basin, agitator arms fixed to the drum and extended into the basin whereby its contents will be stirred when the drum is rotated, a series of spring clamps fixed to the drum about its periphery whereby confections may be supported after being dipped and in position so that drippings therefrom will fall into the basin.

3. A device of the class described, comprising in combination a boiler, a basin supported in the boiler wherein a coating material for confections may be contained; said basin having a dipping well at one side thereof, a horizontally revolving drum supported centrally above the basin, a series of spring clamps fixed to the drum about its periphery whereby confections after being dipped in the well may be supported so that drippings therefrom will fall into the basin, agitator arms fixed to the drum and adjustable within the basin.

4. In a device of the class described, the combination with a revolubly mounted drum, of a series of confection supporting clamps fixed thereto each of said clamps comprising a spring metal strip having a base portion fixed to the drum and having opposite side arms drawn together near the base and secured by a bolt therethrough; said bolt having a nut thereon whereby the tension of the outer ends of the arms may be adjusted against an article that may be inserted between them by adjustment of the said nut along the bolt.

Signed at Seattle, Washington, this 27th day of February, 1922.

WILLIAM C. MORGAN.